Dec. 18, 1934.  S. L. CASELLA  1,984,568
METHOD OF AND APPARATUS FOR WRAPPING DRY CELL BOBBINS
Filed April 23, 1921  6 Sheets-Sheet 1

INVENTOR:
Secondo L. Casella,
by Byrnes, Townsend + Brickenstein
ATTORNEYS.

Fig.2

Dec. 18, 1934.  S. L. CASELLA  1,984,568
METHOD OF AND APPARATUS FOR WRAPPING DRY CELL BOBBINS
Filed April 23, 1921   6 Sheets-Sheet 3

INVENTOR:
Secondo L. Casella,
by Byrnes, Townsend & Brickenstein,
ATTORNEYS.

Dec. 18, 1934.   S. L. CASELLA   1,984,568
METHOD OF AND APPARATUS FOR WRAPPING DRY CELL BOBBINS
Filed April 23, 1921   6 Sheets-Sheet 4

INVENTOR:
Secondo L. Casella,
by Byrnes, Townsend & Brickenstein,
ATTORNEYS.

Dec. 18, 1934. S. L. CASELLA 1,984,568
METHOD OF AND APPARATUS FOR WRAPPING DRY CELL BOBBINS
Filed April 23, 1921 6 Sheets-Sheet 5

INVENTOR:
Secondo L. Casella,
by Byrnes, Townsend & Brickenstein,
ATTORNEYS.

Patented Dec. 18, 1934

1,984,568

UNITED STATES PATENT OFFICE 1,984,568

METHOD OF AND APPARATUS FOR WRAPPING DRY CELL BOBBINS

Secondo L. Casella, New York, N. Y., assignor to National Carbon Co., Inc., a corporation of New York Application April 23, 1921, Serial No. 463,752

80 Claims. (Cl. 93—5)

This invention relates to a method of and an apparatus for wrapping dry cell bobbins and the like. While the invention is more particularly concerned with an improved method and means whereby a bibulous wrapper may be secured onto a battery bobbin comprising a carbon electrode embedded in a depolarizer mix, it will be understood that certain novel features of the invention may be employed in winding cord about dry cell bobbins and in wrapping other articles.

The depolarizer bodies of dry cell bobbins are generally hand-wrapped with bibulous material, such as gauze, which is secured onto the bobbin by a winding of cord or thread applied by hand. It is practically impossible to obtain a uniform product when the securing cord is wound on by hand, because a manual operator naturally winds on the cord with a lesser tension near the close than at the beginning of the day. The ampere-hour capacity of a dry cell depends, among other conditions, upon the compactness of the depolarizer mix and the contact resistance between it and the electrode embedded therein and since the manual operator usually becomes fatigued, there is a resulting variation in a day's output of bobbins and in the cells in which they are used. Wrapping bobbins manually is also slower and more expensive than wrapping that includes machine operations.

Accordingly, an important object of this invention is to produce dry cell bobbins which are more uniform and less expensive than those heretofore manufactured. Another object is to provide a method of and apparatus for wrapping dry cell bobbins whereby a wrapper may be drawn about a bobbin and a securing cord may be wound thereon at a greater and more uniform tension than is obtainable by hand-wrapping and winding.

The above and other objects and the novel features of this invention will be apparent from the following description taken in connection with the accompanying drawings which are a part of this application and in which.

The wrapping machine herein disclosed for the purpose of illustrating the principles of this invention, generally speaking, comprises a support or saddle S onto which may be placed a bobbin B having applied thereto a suitable wrapper W that projects beyond opposite ends of the depolarizer body D of the bobbin. The wrapper is applied to the bobbin by hand and the bobbin is inserted in and removed from the saddle by the attendant of the wrapping machine who, by depressing the saddle, sets the machine in operation. The principles of this invention are not limited to the manual performance of these operations, which may obviously be performed automatically by additional mechanism. To secure the wrapper to the bobbin, the latter is positioned accurately in the saddle, whereupon the wrapper is drawn tightly around the bobbin and the projecting ends thereof are folded inwardly over the ends of the depolarizer body D and, at the upper end, against the carbon electrode C which projects from the depolarizer body. The inwardly folded ends of the bobbin wrapper are then gripped to support the bobbin independently of the saddle while a securing cord T or the like is wound about the wrapper and about the inwardly folded ends thereof. The wrapper applying and gripping mechanism may include a pair of opposed chucks K and K', and the securing cord may consist of a thread, cord or ribbon of bibulous material. The securing cord may be mechanically wound about the bobbin in various ways, most desirably by retaining one end of the cord in fixed relation to the bobbin, as by means of a clamp L mounted on the chuck K, and rotating the chucks and the bobbin carried thereby. Such rotation causes the cord to be drawn from the cord supply through suitable tension means and, by suitable guiding means, such cord is wound onto the bobbin and about the ends of the bobbin wrapper as the bobbin rotates. The desired manipulation of the cord may be effected by moving a cord guide G back and forth along the bobbin as it rotates and draws the cord from the cord supply. The wrapping mechanism is so constructed and arranged that the major part of the projecting electrode will be left bare with no wrapper or cord winding thereon, and successive cord turns on the cylindrical part of the depolarizer body will be spaced apart substantial distances to leave the greater part of the wrapper uncovered by cord so that there will be a minimum amount of cord on this part of the bobbin to cause no serious interference with the electrolytic action when the bobbin is assembled in a cell. Suitable means, such as a sealing-wax applying device J, may be provided for securing the cord upon completion of the winding operation, and means, such as a knife I, may be provided for severing the cord after the last turn thereof has been secured onto the bobbin. The loose ends of the securing cord may then be removed, as by a mechanism CR adapted to burn off such ends. Suitable mechanism then restores the parts to a position for receiving another bobbin and repeating this cycle of operations.

The wrapping machine comprises a frame or pedestal F having a base f adapted to be mounted on a support such as a table. The frame F carries a pair of spaced, oppositely disposed arms F', F'' and forwardly and rearwardly extending arms f', f'' disposed in a plane between and perpendicular to the plane of the arms F', F''. The upper ends of the arms F', F'' carry pairs of aligned bearings 25, 25' and 26, 26' for supporting the chucks K, K' and mechanism for operating the same. As is well known, the usual form of battery bobbin B used in dry cells comprises a carbon electrode C that is embedded in a substantially cylindrical body of depolarizing material D, which may consist of a compacted mixture of carbon or graphite and manganese dioxide, both in powdered form. The depolarizing body D is usually provided with a wrapper of suitable bibulous material, such as gauze, paper or the like, such wrapper projecting beyond the ends of the body D and being folded inwardly over the ends of the said body and secured thereto by a cord, thread or the like. Heretofore the projecting ends of the wrapper W have been folded inwardly by hand and the securing cord has also been applied manually. The chucks K, K' are designed to mechanically fold the projecting ends of the wrapper W inwardly over the ends of the depolarizer body D and to grip these inwardly folded ends to support the electrode so that it may be rotated and the securing cord applied thereto.

Figures 1, 16B:
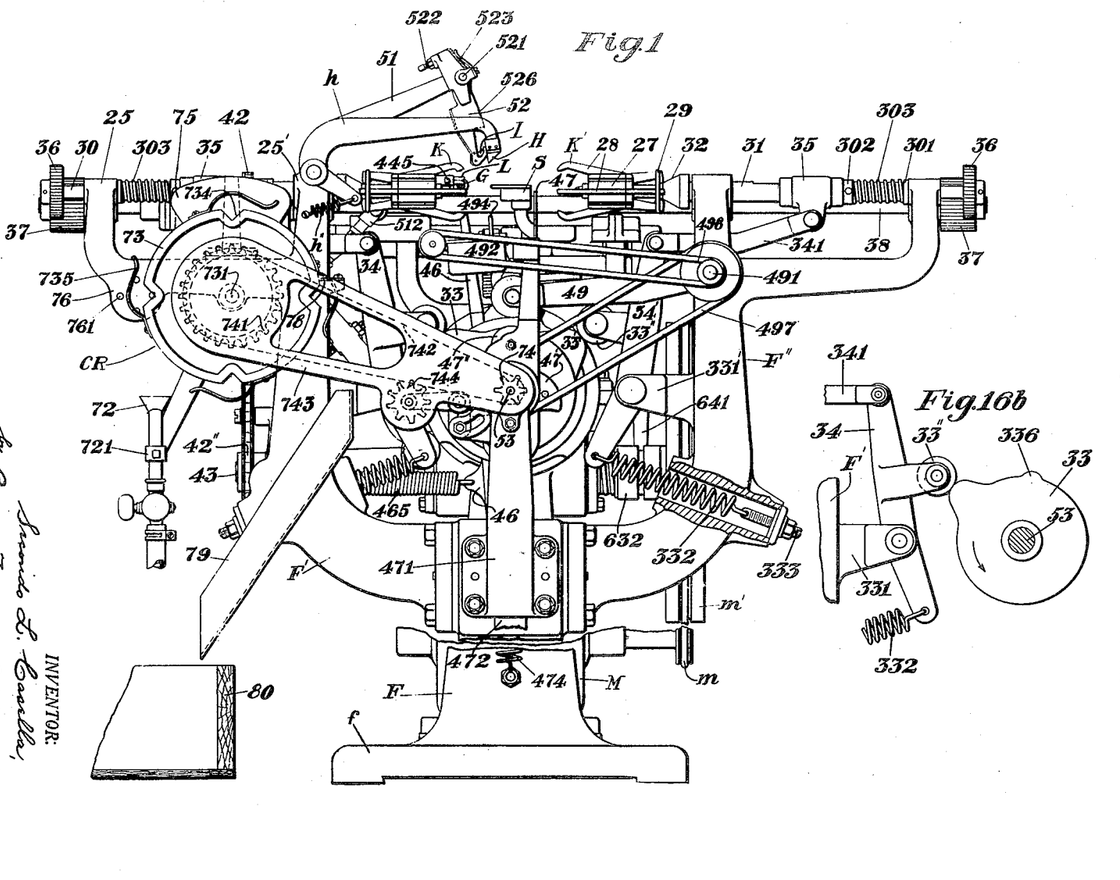
Figs. 1, 2 and 3 are, respectively, a front elevation, a side elevation and a top plan view of a bobbin-wrapping machine embodying this invention.
Fig. 16b is a view illustrating the cam mechanism and associated parts for controlling one of the bobbin gripping chucks.
Figures 3, 17, 18, 19, 20:
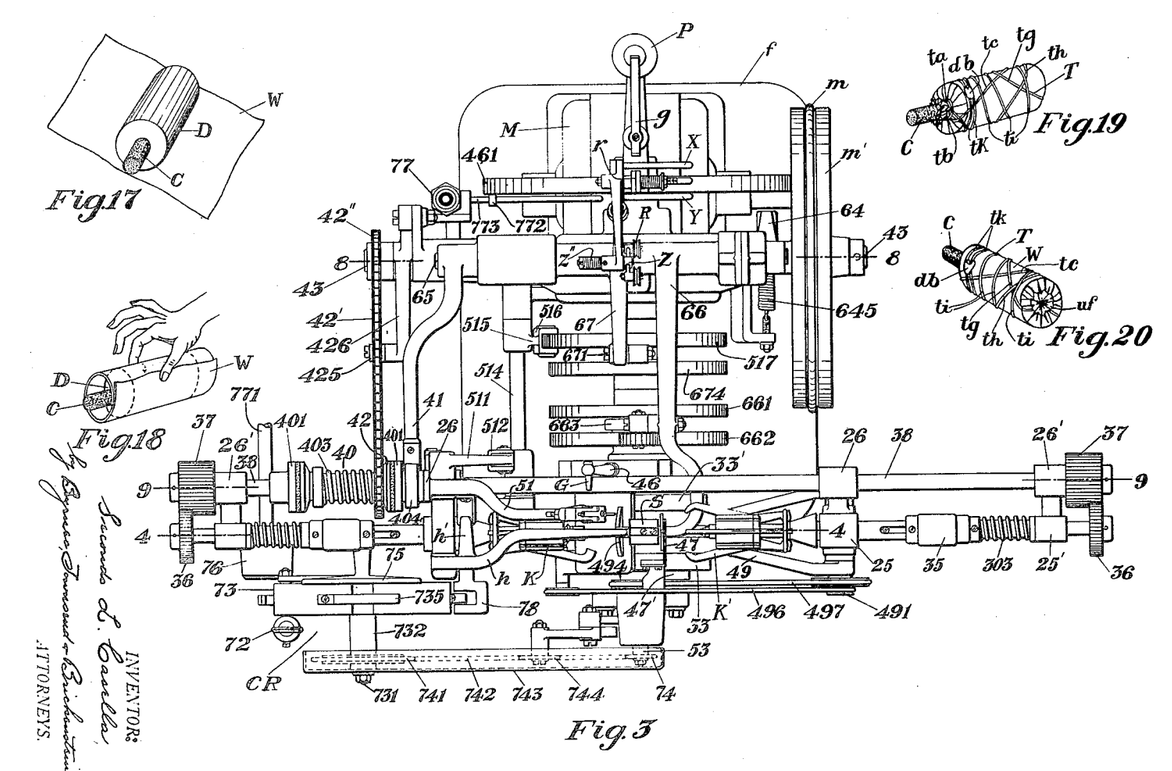
Figs. 17 and 18 are views illustrating a bobbin and the wrapper therefor, before and after application of such wrapper to the bobbin.
Figs. 19 and 20 are views illustrating a bobbin wrapped by a machine embodying this invention.
Figures 4, 5, 6, 7, 8:
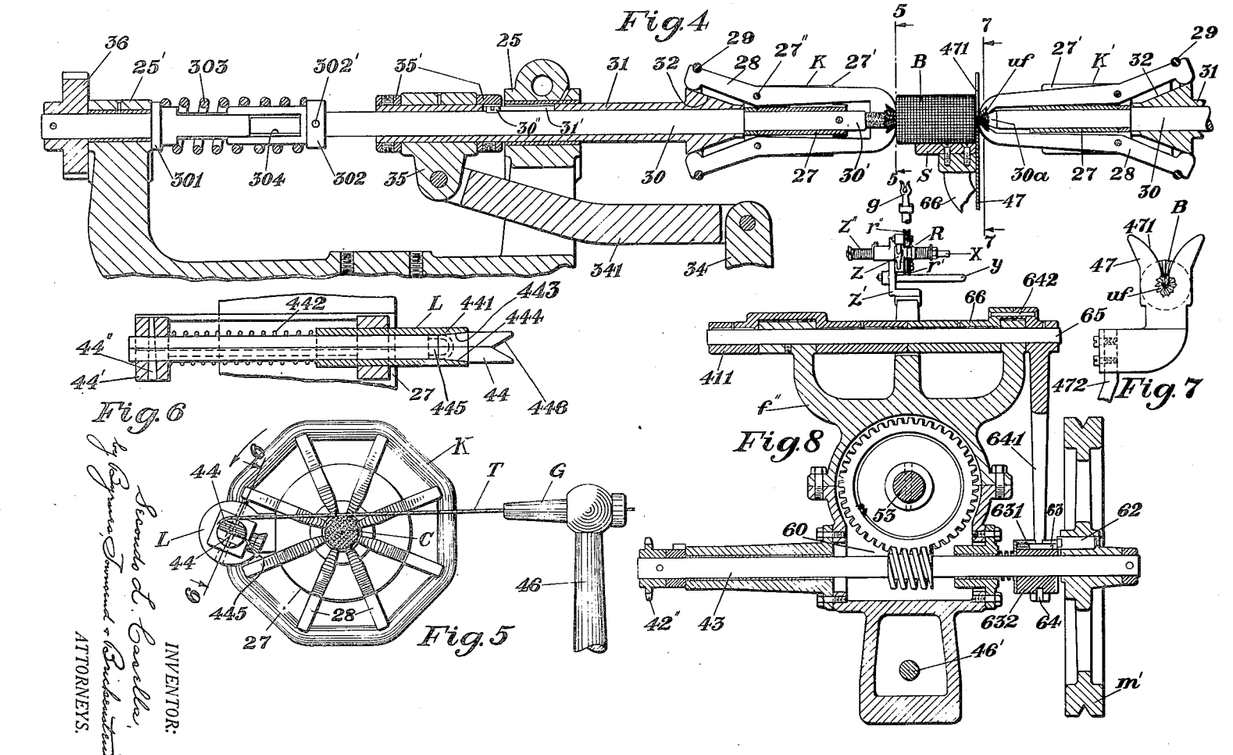
Fig. 4 is a sectional view of the chucks, on an enlarged scale, taken on the line 4—4 of Fig. 3, parts being shown in elevation.
Fig. 5 is an enlarged detail view taken on the line 5—5 of Fig. 4.
Fig. 6 is a detail view of the cord retaining means, taken on the line 6—6 of Fig. 5.
Fig. 7 is a detail view of the tucker, taken on the line 7—7 of Fig. 4.
Fig. 8 is a view of the main drive mechanism and associated parts, taken on the line 8—8 of Fig. 3.

Referring more particularly to Figs. 1, 3 and 4, inasmuch as the chucks K, K' and the supporting and operating means therefor are substantially similar, only the chuck K will be described in detail. The chuck proper comprises a supporting head 27 that is provided with a series of outwardly opening longitudinal slots 27'. A series of folding and gripping fingers 28 are pivoted intermediate their ends as at 27'' in the slots 27' and are normally held in open position by an elastic band 29 which encircles and engages the rear ends of the fingers. The head 27 is secured to a spindle 30 that is disposed within a sleeve 31 rotatably and slidably mounted in the bearing 25. One end of the sleeve 31 is frustro-conical in form and constitutes a chuck-closing cam 32 for spreading the rear ends of the chuck fingers 28 against the tension of the band 29, and closing the forward ends of the fingers to cause them to draw a wrapper W tightly about the body D of a bobbin and fold the projecting ends of such wrapper inwardly over the ends of the depolarizer body, and at one end, against the electrode C of the bobbin. The cams of the chucks retain the fingers in such a position as to grip the inwardly folded ends of the wrapper to support the bobbin B at its ends only.

The cams 32 may be moved relatively to the fingers 28 by suitable means, as by cams 33, 33' operating levers 34, 34', and as best illustrated in Fig. 4, the lever 34 is connected by a link 341 to an ear 35 on the sleeve 31 that carries the cam 32. The sleeve 31 is rotatable relatively to the ear 35, the opposite ends of the ear 35 bearing against spaced collars or shoulders 35' on the sleeve 31 so that the sleeve may rotate while it is moved axially.

The bobbin with the wrapper applied thereto is initially placed upon the saddle S so that it is disposed a trifle to the left of the position that it should occupy when the chucks close, and in order to position the bobbin accurately to enable the chuck fingers to fold the wrapper and grip the bobbin properly, a projection 30' may be provided at the outer end of the spindle 30 adapted to engage the end of the carbon electrode of the bottom to push the latter into the proper position. The spindle 30 and the projection 30' thereof are movable to their operative positions by movements of the ear 35. The spindle 30 of the chuck K' may be provided with a center 30a having a pointed outer end adapted to engage and center the bottom end of the bobbin.

The chucks K, K' carrying the bobbin are rotatable in their bearings 25, 25', so that thread, cord or the like may be applied to the bobbin. The spindle 30 carries a pinion 36 at its outer end by means of which the same and the sleeve 31 splined thereto are rotated. The spindle carries abutments 301 and 302 for a spring 303, said abutments being connected together by a spline 304 to slide axially relatively to one another. The abutment 302 is secured to the spindle 30 by a pin 302' and is engaged by the sleeve 31 when the chucks are opened, compressing the spring 303 and moving the spindle 30 and pinion 36 axially toward the left. As illustrated in Fig. 4, when the ear 35 is moved toward the right by lever 34, the spindle 30 follows it due to the pressure of spring 303, the end 30' engaging the carbon electrode and moving the bobbin accurately into position. The movement of the spindle toward the right is limited by the pinion 36 abutting against the arm carrying bearing 25', but the ear 35 continues moving and operates the cam 32 to close the chuck fingers 28.

Figure 9:
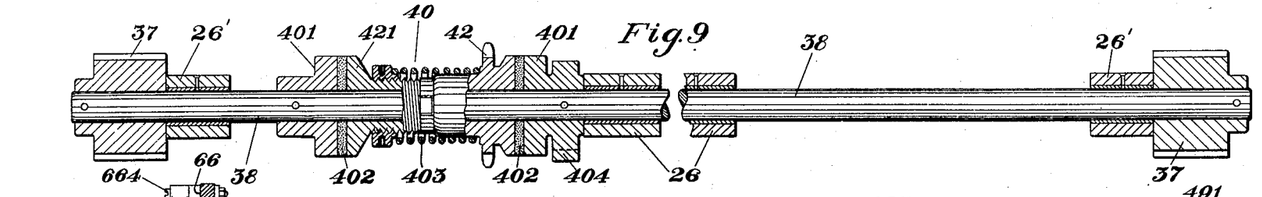
Fig. 9 is a sectional view, on an enlarged scale, of mechanism for rotating the chucks, taken on the line 9—9 of Fig. 3, Figs. 10, 11, 12, 13, and 14 are views on an enlarged scale illustrating successive positions of the mechanism for manipulating the securing cord at the completion of the winding operation.

Simultaneous rotation of the chucks K, K' in the same direction is effected by pinions 37 mounted on the opposite ends of a counter shaft 38 and meshing with the pinions 36, 36 on the spindles 30. The shaft 38 is mounted in the pairs of bearings 26, 26' on the frame arms F", F'' and rotation thereof is effected by a clutch mechanism 40 controlled by a latch lever 41. A rotating sprocket 42 is loosely mounted on the shaft 38 and constantly driven by a chain 42' from a sprocket 42'' driven by the shaft 43. The clutch 40 may be of any type adapted to couple the shaft 38 to the sprocket 42, and as shown in Fig. 9 comprises a pair of spaced abutments 401 secured to the shaft 38. The sprocket 42 and a collar 421 are loosely mounted on the shaft 38 between the abutments 401 and spaced therefrom by leather or other friction washers 402. A predetermined pressure between the abutments 401, sprocket 42 and the collar 421 may be maintained by an adjustable helical spring 403 which normally tends to separate the sprocket and collar which are splined together to permit such separation. The latch 412 on the lever 41 normally prevents the rotation of the shaft 38, engaging a tooth 404 on the collar 401 that is secured to the shaft 38. Upon release of the latch by mechanism hereinafter described, the collar 401 is released and the shaft 38 is free to be rotated. During the engagement of the tooth 404 by the latch 412, the sprocket 42 continues to rotate, the leather washers permitting the relative sliding of the sprocket 42 and collar 421 with respect to the collars 401.

The cord, thread or the like may be applied in various ways to the bobbin B supported at its ends in the chucks K, K'. While a thread or cord is illustrated as the securing means, it will be understood that other suitable means, such as a narrow ribbon, may also be employed. As illustrated, the cord is wound onto the bobbin and around the ends of the wrapper thereon by rotating the bobbin and drawing the cord onto the same from a suitable cord supply, while the cord is guided back and forth along the bobbin. Initially, the cord is clamped adjacent its free end by a clamp device L that is carried by the chuck K. As best illustrated in Figs. 1, 5 and 6, the clamping device comprises a pair of similar opposed jaws 44 secured by a pin 44'' to a bracket 44' mounted on the chuck head 27. The jaws are substantially semi-cylindrical in section, the flat sides thereof facing one another and pressed together by a sleeve 441, so as to securely clamp a cord therebetween. The sleeve 441 is pressed lengthwise toward the outer end of the jaws by a helical spring 442, the clamping action being obtained by the cooperation of tapering portions 443 and 444 of the sleeve and jaws, respectively. The sleeve 441 has a projection 445 that is engageable by suitable cam means (to be described) to press the sleeve against the tension spring 442 to remove the clamping action thereof so that the cord held between the jaws may be removed and the jaws may be readily rethreaded, the outer ends of the jaws being provided with cooperating beveled surfaces 446 to facilitate the rethreading of the jaws as will be explained.

Figure 2:
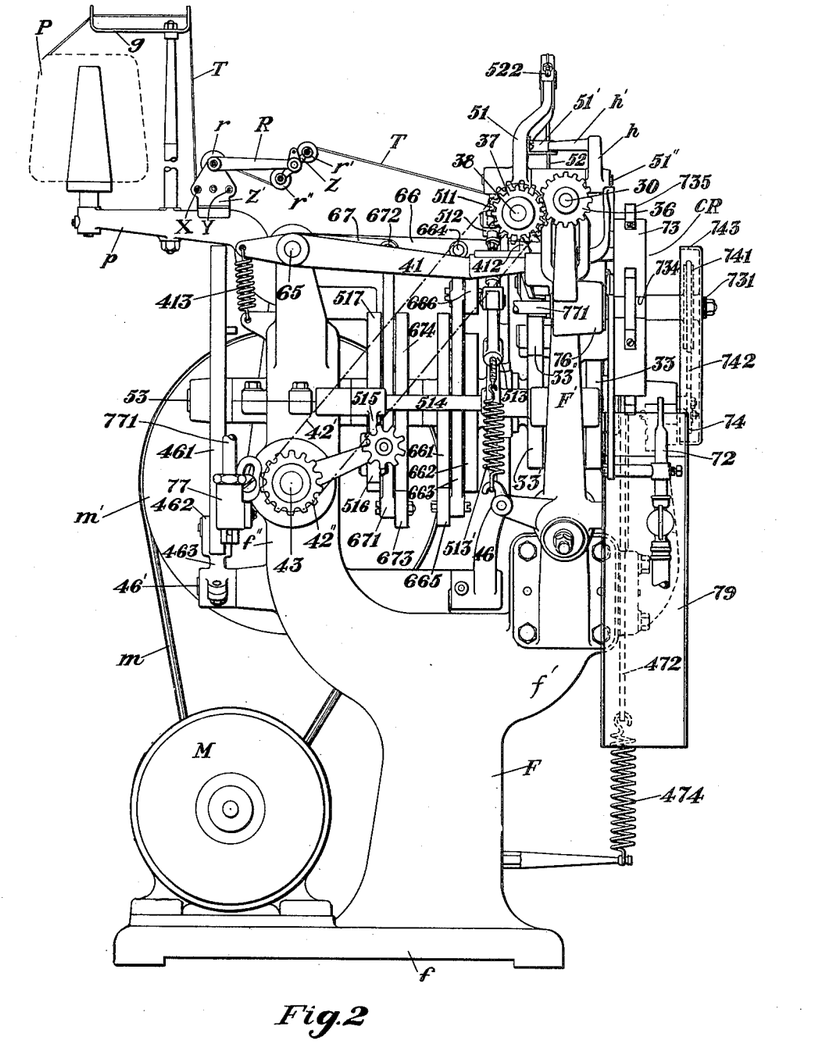

The cord or the like is obtained from a supply spool P mounted on a bracket p on the machine and is guided to the point of application to the bobbin through guides g and G. Suitable adjustable tension applying means R may be arranged to maintain the desired tension on the cord as it is applied to the bobbin. As best shown in Figs. 2, 3 and 8, the tension device R comprises a pair of fixed rods X and Y around which the cord passes, a pair of cooperating tension disks r, a swingable double arm tension device z comprising pairs of tension applying rollers r', r'', all mounted on the bracket z', said double arm device being yieldable against the torsion of a spring z''. The initial tension is applied by the disks r, which are adjustable, and the double-arm device acts as a compensating means to quickly take up any slack in the cord as the diameter of the turns varies.

Figures 16, 16A:
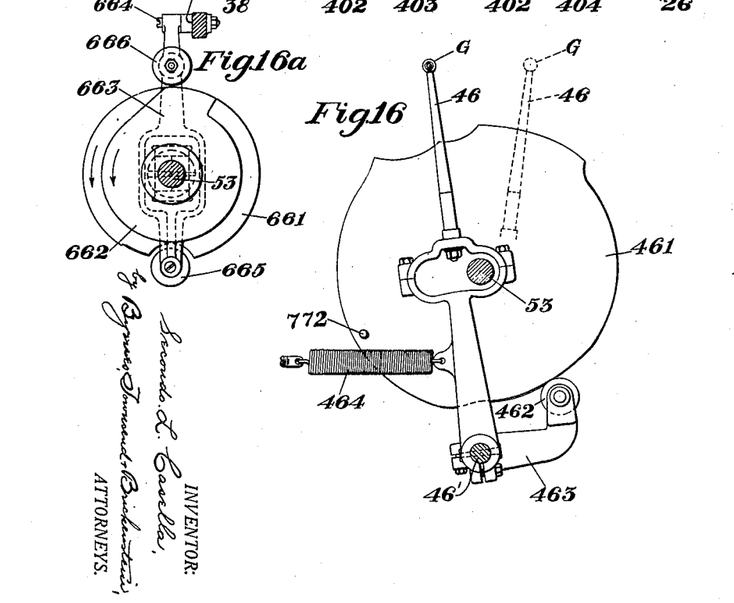
Fig. 16 is a view illustrating the cord guide and traverse lever carrying the same, with the mechanism for actuating this lever.
Fig. 16a is a view illustrating the cam mechanism and associated parts for controlling the bobbin saddle.

Machine winding has the advantage that a more uniform and a greater tension may be applied to the cord as it is wound onto the bobbin and with such machine-wound bobbins a superior dry cell may be manufactured. The contact resistance between the body of the depolarizer and the carbon electrode is substantially reduced, and the capacity of the cell utilizing the bobbin is considerably increased (1) the tightness with which the wrapper is drawn about the depolarizer body by the folding and gripping fingers 28 and, (2) by the tension with which the cord is applied about the wrapper and especially about the end of the wrapper that lies against the carbon electrode. From the tension device R the cord passes through a guide eye G that is located adjacent the bobbin and is supported at the upper end of a traverse lever 46 which latter is pivoted at its lower end as at 46'. (See Fig. 16.) The operation of the traverse lever 46 moves the guide G longitudinally of the bobbin and lays the cord so that it secures the wrapper to the depolarizer body and also secures the inwardly folded ends in the position in which they are held by the folding and gripping fingers 28.

After a half revolution, the cord and the mechanism for winding it onto the bobbin are in the position shown in Fig. 5, the clamp L being shown on the side opposite which it occupies at the very beginning of the winding operation. The traverse lever 46 that moves the guide G is operated by a cam 461 (see Fig. 16) that engages a roller 462 mounted on a bracket 463 connected to the lever 46, the cam being of such contour as to move the guide G back and forth along the bobbin so that the cord will be drawn from the cord supply and laid on the bobbin in the desired place and in the desired number of turns. The contour of the cam 461 may be varied in certain respects. In the present apparatus the movements are substantially as follows: For about one revolution of the bobbin the guide G is substantially stationary. The cam 33 that operates the fingers of the chuck K has a projection 336, see Fig. 16b, which now momentarily releases these fingers a trifle to permit the cord being wound to draw the inwardly folded end of the wrapper more closely to the top end of the bobbin body. The guide G at the same time moves toward the upper outer end of the bobbin so that the next turn of the cord will cross the first turn and thereby secure or practically tie the cord to the bobbin so that later the end that is held by the clamp L may be released without danger of unravelling the winding of the bobbin, as at turns ta and tb Fig. 19. After about another turn around the inwardly folded end of the wrapper that is disposed about the electrode, the guide G is moved along the bobbin to a position opposite its bottom end, at a speed such as to lay a comparatively steep helical turn *tc* onto the body of the rotating bobbin. Adjacent the bottom end of the bobbin, the guide G is held in a stationary position during one or two revolutions to wind one or two convolutions of cord around the inwardly folded end of the wrapper at the bottom end of the bobbin. This end is in the form of a tuft *uf*, having previously been gathered and packed by a tucker 47 illustrated in Figs. 4 and 7. The tucker 47 is in the form of a rigid thin metal plate and has a V-shaped notch 471 to gather and pack the inwardly folded end of the wrapper at the bottom end of the bobbin, forming a tuft or bunch. The tucker 47 is carried by a slide member 472 which, as illustrated in Figs. 1 and 2, is movable in a guide 471 on the front frame member F′ and is normally held out of operative position by a spring 474 and moved into operative position at proper times by suitable cam means 47′ adapted to engage a roller 47″ on the slide 472. The traverse lever 46 now again moves the guide G to a position opposite the carbon or top end of the bobbin laying on turn *tg* and holds it there during a partial revolution of the bobbin applying a partial turn around the carbon after which the lever carries the guide G in the opposite direction to a position that is opposite a point short of the tuft or lower end of the bobbin, laying on turn *th*, then reversing again and moving somewhat more slowly toward the carbon end of the bobbin, laying on turns *ti*, stopping at a point opposite but short of the carbon end of the bobbin where it remains stationary for about two revolutions of the bobbin, laying on turns *tk*.

Figures 15, 15A:
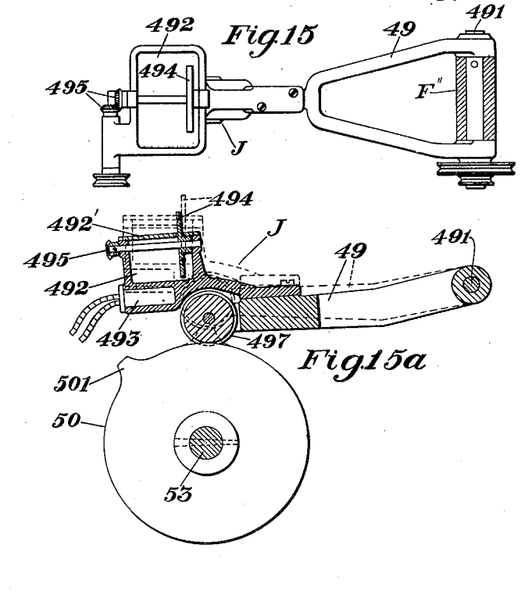
Figs. 15 and 15a are, respectively, side and top views of the sealing-wax applying device.

The rotation of the bobbin thereupon ceases and mechanism comes into action to apply adhesive, such as a dab *db* of hot sealing wax, to the last turn and adjacent turns of the cord and to adjoining portions of the wrapper. As illustrated in Figs. 1, 15 and 15a, the mechanism for applying sealing wax includes a frame 49 pivoted at 491 on the frame F″ and carrying a wax container 492 at its outer end that is heated, as by electrical resistance 493. The lower portion of an applying wheel 494 runs in the container 492 through a slot in the cover 492′ thereof and carries an adhering coating of hot sealing wax out of the container as it rotates, the excess sealing wax being scraped off the wheel by the edges of the slot in the cover. The wheel 494 is driven by suitable gearing 495 and belts 496 and 497 which are arranged to maintain a driving connection between a source of power and the wheel 494 as the latter is raised into engagement with the bobbin by the projection 501 on the rotating cam 50 engaging the roller 497 rotatably mounted near the outer end of the frame 49. Immediately thereafter the wax-applying device returns to its normal position.

The mechanism for freeing the clamped end of the securing cord on the bobbin and for re-threading the clamp L and severing the cord now comes into action. A lever 51 rockably mounted in a suitable bearing in the upper end of the arm F″ carries a plate 52 at its outer end that is pivoted at 521 and held in position against an adjustable stop 522 by a spring 523 that bears against the plate above the pivot 521. The rear edge of the plate 52 comprises a cam 524 that is adapted to engage the pin 445 on the sleeve 441 of the cord clamp L as the lever 51 is rocked downwardly and the plate 52 descends. The cam edge 524 pushes the sleeve 441 against the tension of the spring 442 and releases the clamping action of the jaws 44, the plate 52 moving into the space between the bobbin and the jaws. Further downward movement of the plate 52 causes a hook-portion 525 thereof to engage that part of the cord between the bobbin and the jaws, withdrawing this end of the cord downwardly from between the jaws. In the meantime a rockable arm *h* carrying a cord holding foot H rocks into position to cause said foot to press against the bobbin at a point beyond the dab of adhesive forming a stop to catch the last turn of the cord so it will not be pulled loose while the wax is cooling and while the cord is being severed. The rocker arm 51 and the plate 52 carried by it now ascend, but before the cam edge 524 releases the sleeve 441 to reclamp the jaws together, the cord, at a point between the holding foot H and the cord guide G, slips in between the jaws, whereupon the sleeve 441 is released to clamp the jaws together. Thereupon the cutter I, carried by the plate 52 in a recess below the hook 525, engages the cord between the foot H and the clamp L and severs it. Other means of severing the cord may also be employed. The cutter I and the foot H, the arm *h* of which has a projection *h'* engageable by the projection 51′ of the cutter arm 51, move away from the bobbin, leaving the jaws threaded and the cord on the bobbin released at both ends so that the bobbin may be lifted out of the saddle S which is raised to receive the wrapped bobbin as it is released by the opening of the chucks K, K′. The rocker arm 51 may be operated by suitable means, and as illustrated, has an operating lever 511 that is connected to adjustable linkage 512 and a lever 513 which is carried by a rock shaft 514 mounted on frame members *f'*, *f″*. The rock shaft carries a rocker arm 515 which has a roller 516 mounted at its outer end and held in contact with the edge of a cam 517 by a spring 513′ that is adjustably connected to the lever 513 and the frame member F′. The cams 461, 50 and 517, are secured to the cam shaft 53 that is rotatably mounted in the front and rear arms *f'*, *f″* of the frame. This cam shaft also carries the two cams 33 and 33′ which are adapted to operate the chuck cams 32 operatively connected to the levers 34, 34′ which are pivoted in brackets 331, 33′ on the frame members F′, F″. These levers carry rollers 33″ engageable by suitable projections on the cams 33 and 33′ to close and open the chucks K, K′ during the proper periods in the cycle of operations. The lower ends of the levers 34, 34′ are yieldingly and adjustably secured to the frame by springs 332 and bolts 333, as illustrated in Fig. 1, such securing means holding the rollers 33″ in engagement with their respective operating cams. The cam shaft 53 also carries a suitable cam 47′ that engages roller 47″ on the tucker bar 472 to raise the same at the desired time in the winding operation, the spring 474 withdrawing the same after one turn has been wound around the tuft formed thereby.

The main drive shaft 43 (see Fig. 8) is connected by worm-gearing 60 to the cam shaft 53 to drive the latter, the main shaft being driven by any suitable power such as an electric motor M mounted on the base *f* and connected by a belt *m* to a flywheel *m'* that is loosely rotatable on the shaft 43. Suitable clutch mechanism may be provided to couple the loose flywheel *m'* to the shaft 43 to operate the machine through a cycle. As shown, the flywheel carries a pin 62 which engages a clutch dog 63 that is slidable in a groove 631 of a clutch ring 632 secured to the shaft 43. The clutch dog has a cam surface that is engageable by a releasing cam 64 at the lower end of a lever 641 that is rockably mounted near its upper end on a supporting shaft 65 fixed in the rear frame member f''. Pins 642 secure the lever 641 to the rear end of the lever 66 that is also rockably mounted on the shaft 65 and carries the bobbin saddle S at its forward end adjacent the chucks K, K'. The depression of the saddle, with a bobbin therein having a wrapper applied thereto, moves the cam 64 rearwardly and releases the dog 63 so that it may project into the path of the pin 62 on the flywheel, thus coupling the latter to the shaft 43. Control and restoration of the lever 66 may be effected in any suitable manner and as illustrated may be effected by a spring 645 and two cams 661 and 662 on the cam shaft 53 and on opposite sides of a link 663 connected to and suspended from an intermediate point 664 of the lever 66. (See Figs. 2 and 3.) The link 663 carries a roller 665 at its lower end normally held in a recess in the cam 661 by the spring 645 acting on the double arm lever 641, 66, and a roller 666 near the upper end of the link 663 is spaced from and at times cooperates with a projection on the cam 662.

The latch lever 41 is also rockably mounted on the shaft 65 (see Figs. 3 and 8) and is integrally connected to an arm 67 having a link 671 pivotally suspended therefrom at 672. The link 671 carries a roller 673 at its lower end that is held against the cam 67 by the spring 413. The cam 674 is rotatable with the cam shaft 53 and operates the levers 67 and 41 to release the latch tooth 412 after the chucks K, K' close to permit the latter and the bobbin thereon to be rotated.

The sequence of operations of the bobbin wrapping machine is briefly as follows: After the operator has applied a wrapper to the bobbin, as illustrated in Figs. 17 and 18, the bobbin is set in the saddle S, a trifle to the left of its correct position, as viewed in Fig. 4. The operator presses down on the bobbin and the saddle supporting it, which depresses the lever 66 and the link 663, moving the roller 666 against the cam 662, which acts as a stop, also removing the roller 665 from the deeper part of the recess in cam 661. A shallower part of said recess locks said saddle in depressed position while the chuck fingers are closing and gripping the bobbin wrapper, so the attendant may let go of the bobbin. Further rotation of the cam 661 lowers the saddle more so that the bobbin may be rotated freely. The cam on the lever 641 releases the clutch dog 63 into the path of the clutch pin 62 so that the motor may drive the shafts 43 and 53. The cams 33, 33' actuate the levers 34, 34' to move the chucks K, K' toward the top and bottom ends of the bobbin and the gage pin 30' against the carbon electrode to accurately position the bobbin in the saddle before the chuck fingers 28 are closed. Then cams 32 spread the tail ends of the fingers 28, causing the outer ends of the fingers to draw the wrapper W tightly about the bobbin, folding the projecting ends of the wrapper inwardly over the ends of the bobbin and gripping the inwardly folded portions near the centers of the ends of the bobbin body. The fingers adjacent the bottom of the bobbin close together completely while those at the top end only close together to the carbon electrode, the excess portion of the wrapper being clamped between the inner faces of the fingers and the carbon. The saddle then descends away from the bobbin, which is now gripped and supported at its ends by the chuck fingers and is ready to be rotated and to have the securing cord wound thereon between the chucks.

During the rotation of the main drive shaft 43, the sprocket 42'' constantly drives the sprocket 42 through the chain 42', but the latch 412 that engages the tooth 404 prevents the rotation of the shaft 38 and the chuck spindles 30 operatively connected thereto until the proper projection on the cam 674 engages the roller 673 on the link 671 and rocks the lever 67 that is connected to the lever 41 carrying the latch 412. Thereupon the clutch shown in Fig. 9 is released so that the sprocket 42 drives the shaft 38 through the frictional engagement of the drive members 42, 421 and abutments 401, and the meshing pairs of pinions 37 and 36 rotate the spindles 30 and the bobbin carried by the chucks thereon. The tucker 47 is now raised into operative position by a cam 47' that engages the slidable bar 472, thus compacting the inwardly folded bottom end of the wrapper and forming the tuft uf.

The cord is held near its end in the clamp L, as shown in Fig. 5, and when the bobbin starts rotating, the guide G is in a position opposite the inwardly folded upper end of the wrapper. The arrangement is such that as the bobbin rotates, the cord is drawn from the supply spool P and applied to the bobbin at the desired tension by the tension device R. During the revolution of the bobbin, the guide G is moved back and forth along the bobbin by a cam 461, the contour of which is such that a number of turns will be laid on and placed as desired. The first turn of the cord is wound close to the end of the depolarizer body and then the guide G is moved slightly farther outward toward the end of the carbon so that the succeeding turn will cross the first turn and thereby tie in the free end of the cord so that this end may later be released from the clamp L without danger of unravelling the cord winding. After about another revolution of the bobbin, the guide G moves toward the bottom end and stops opposite the inwardly folded bottom end of the wrapper where about two turns of the cord are wound. The guide G now moves to a position opposite the upper inwardly folded end of the wrapper where about another ½ turn is wound. Then the guide G again moves toward but stops short of the lower end of the bobbin, laying on a turn, reversing and moving more slowly toward but stopping short of the upper end of the bobbin, where about two turns are wound on. Thereupon the cam 674 releases the link 671 allowing spring 413 to raise the levers 67 and 41 to move the latch tooth 412 into position to engage the tooth 404 to stop the rotation of the shaft 38 and the spindles 30, 30, chucks K, K' and bobbin carried thereby. The sealing-wax applying wheel 494 is then raised by the cam tooth 501 and applies a dab of sealing wax to the last turn of the cord, and to adjacent turns and an adjacent portion of the wrapper. The cam 47' in the meantime has released the tucker 47 and the spring 474 has pulled it back to normal position.

The cam 517 now lowers the arm 51 which moves the cam edge 524 against the projection 445 of the clamp L and releases the end of the cord between the jaws 44, 44 so that the hook 525 may withdraw such end as the arm 51 continues to descend. At the same time the holding foot H is lowered and presses against the bobbin at a point between the dab of sealing-wax and the guide G, and as the arm 51 is raised by the cam 517, the section of cord between the foot H and the guide G is so bent out of line by the upper part 526 of the plate 52 that when it is released into the notch of the plate below the hook 525, it will snap or slip between the jaws 44, the take-up device Z assisting to draw the cord straight and the foot serving as a cord stop. As the arm 51 rises higher the cam edge 524 moves away from the projection 445, restoring the jaws 44 to clamping position. Thereupon the knife I engages the cord at a point between the clamp L and the foot H and severs it, leaving the clamp L in a rethreaded condition. The lever 517 now raises the arm 51 and the projection 51' on the latter which engages the projection $h'$ on the lever $h$ and moves the foot H away from the bobbin.

Figures 10, 11, 12, 13, 14:
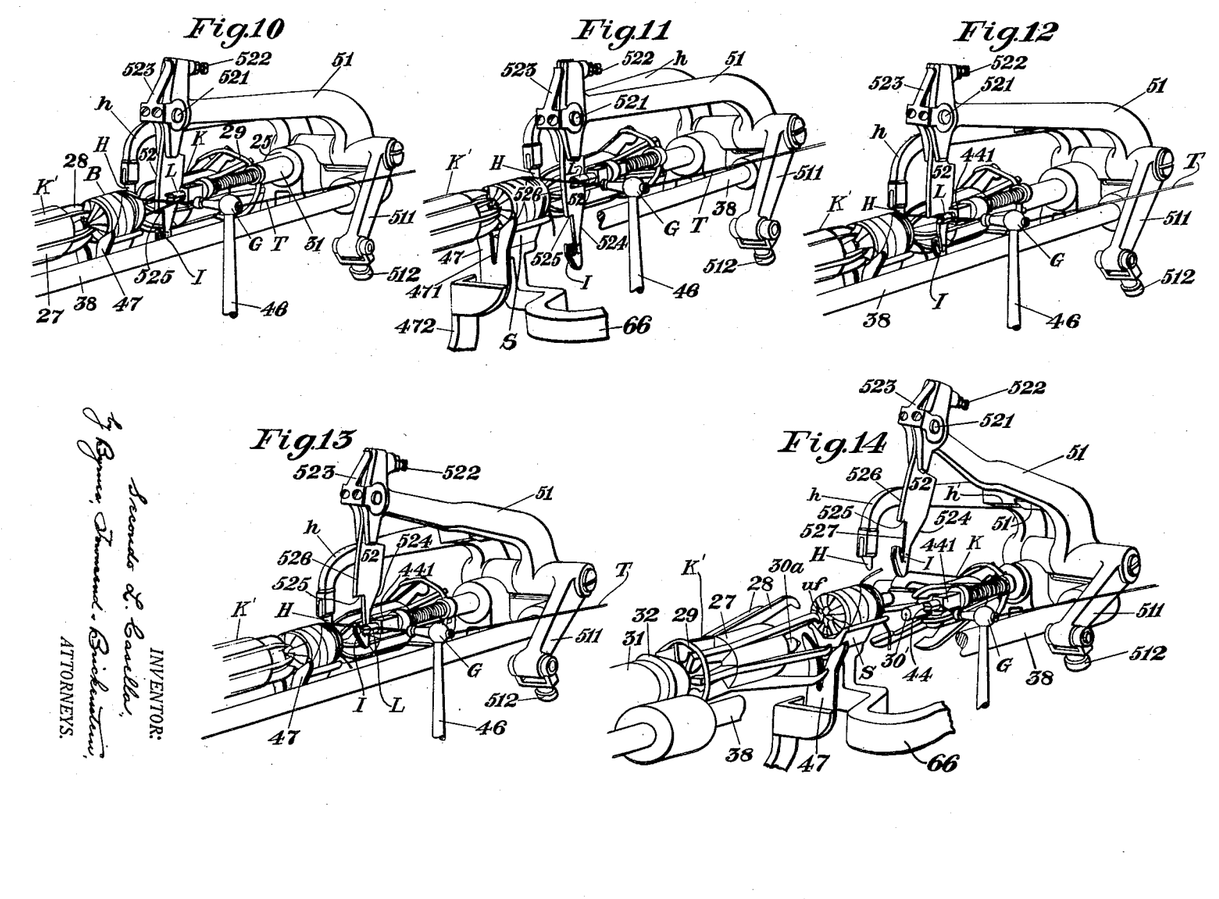

The projections on the cams 33, 33' respectively, now rock the levers 34, 34' to open the chucks K, K' and simultaneously the cam 661 releases and the spring 645 raises the lever 66 and the saddle S thereon so that the latter will be in position to receive the released wound bobbin, which is then ready to be transferred to the mechanism CR for removing the loose ends of the securing cord. It will be noted from Figs. 14 and 19 that the cord winding is secured at a distance back from its ends and at separated points, one adjacent the carbon electrode at the top end of the bobbin and the other on the outer side of the bobbin near the top end. Loose ends are thus left hanging from the bobbin which are undesirable and the cord removing mechanism is designed to remove or eliminate them. Various means may be employed for this purpose, the mechanism herein illustrated for burning off such loose ends being a particularly simple and efficient one, comprising an igniting means, such as a flame 72 and a carrier 73 adapted to receive the wound bobbins and carry them past the flame. The loose ends of the cotton cord, upon being ignited, will continue to burn to the points where the winding is secured, and will be automatically extinguished at such points by the dampness or moisture of the bobbin. In the present arrangement, the rotatable bobbin carrier 73 may be mounted on a stud 731 fixed in a suitable boss 732 on the front side of the frame member F'. The bobbin carrier 73 may be provided with seats 734 in its periphery, spring gripping fingers 735 being secured to the bobbin carrier and overhanging these seats temporarily hold the bobbins therein. The bobbin carrier 73 may be intermittently rotated from a sprocket 74 on the outer end of the cam shaft 53 that is coupled by a chain 742 to a sprocket 741 secured to the bobbin carrier. A suitable guard 743 encloses the sprockets and chain and an idler sprocket 744 serves to tighten the chain. The bobbins as removed from the saddle S, may be transferred by the attendant to the uppermost seat of the bobbin carrier, the bobbin being inserted in the seat so that the bottom end thereof abuts against the gauge plate 75 secured to the arm F'. The loose ends of the winding on the bobbin may be hanging in various directions, and in order to position them so that they will extend outwardly where the flame can ignite them, means such as an air blast is directed lengthwise from the rear end of the bobbin to blow these loose ends outwardly. A nozzle or blast-head 76 is mounted on the arm F' at a point rearwardly of and opposite the position of the next dwell of the bobbin carrier, the head 76 having a series of outlets 761 opposite the outer surface of the bobbin so as to blow the loose ends outwardly toward the top end of the bobbin. The supply of compressed air to the head 76 is controlled by a valve 77 which is connected by a pipe 771 to the head 76 and is operated by a lever 773 that is engaged by a pin 772 on the cam 461. The cord removing mechanism is therefore designed so that the bobbin carrier is moved one-fourth revolution for each revolution of the cam shaft 53 and compressed air is admitted to the head 76 once every revolution of the shaft 53. The flame 72 is disposed between the blast head 76 and the succeeding dwell of the bobbin carrier so that the loose ends will be ignited as the bobbin is carried past the flame 72. The gas flame 72 is desirably fan shape and the burner is suitably mounted on a bracket 721 and is adjustable vertically as well as horizontally and about its axis, to permit the same to be positioned properly for igniting the loose ends. A knock-out device 78 projects into the path of the bobbin and pushes the same out of its seat as the carrier moves by, causing the bobbin to fall down a chute 79 into a suitable receptacle 80.

While the machine is wrapping a bobbin, the attendant may be applying a wrapper to an unwrapped bobbin and, when such machine wrapping is completed, the operator may, with his left hand remove the bobbin from the saddle and transfer it to the carrier while inserting a new bobbin in the saddle with his right hand. It will be understood that these manual operations may be performed mechanically by additional mechanism.

At the same time that the wound bobbin is released by the chucks K, K', the roller 665 is restored to its position in the notch in the cam 661 and the rising saddle lever 66 swings the lever 641 so that the cam at the lower end of the latter engages the clutch dog 63 to move it out of engagement with the pin 62 to uncouple the fly-wheel M' and stop the rotation of the main drive shaft 43. This also stops the cam shaft 53 and restores the machine to its initial condition in readiness to repeat the foregoing cycle of operations when another bobbin with a wrapper applied to it is inserted in the saddle S and depressed as previously described. The bobbin carrier 73 operates in unison with the cord winding mechanism and is stationary during rest periods of such mechanism.

It will be understood that principles of the herein disclosed invention may be employed to secure a wrapper of fabric, paper or other suitable material about the outer cylindrical surface of the depolarizer body, omitting the ends or not as desired, and that by employing principles of this invention a paper, fabric or other suitable tape, core or the like may be wound directly onto the outer surface of the cylindrical depolarizer body to cover the same completely or partially, as desired.

While an improved dry cell bobbin or cathode and method of wrapping the same, and a particularly advantageous apparatus for carrying out such method, have been disclosed, it is to be understood that numerous details of the invention and the construction of such apparatus may be varied without departing from the principles of the invention or sacrificing any of its advantages.

I claim:

1. The method of wrapping an article that comprises applying a wrapper thereto, supporting said wrapped article only adjacent the ends of said wrapper, and winding a cord or the like about said wrapped article including such ends.

2. The method of wrapping an article that comprises applying thereto a wrapper projecting beyond an end of the body thereof, folding such projecting end inwardly, gripping such inwardly folded end and thereby supporting said article, and winding a securing cord about said wrapper and the inwardly folded end thereof.

3. The method of wrapping an article that comprises applying thereto a wrapper that projects beyond the opposite ends of the body of the article, folding such projecting ends inwardly over the ends of such body, gripping such inwardly folded ends to support the article, and winding a securing cord around the wrapper and about such inwardly folded ends.

4. The method of wrapping a dry cell bobbin having a body portion and an electrode embedded in and projecting from one end of said body portion, that comprises applying a wrapper to the body portion of the bobbin, supporting said wrapped bobbin adjacent its ends and rotating it, and applying cord or the like to said wrapped body of the bobbin while the same rotates.

5. The method of wrapping a dry cell bobbin having a body portion of depolarizing material and an electrode embedded in and projecting from one end of said body portion, that comprises applying to the bobbin a wrapper that projects beyond the ends of said body portion, drawing and folding such projecting ends inwardly over the ends of the body, gripping such inwardly drawn and folded ends and said electrode to support the bobbin, rotating said wrapped bobbin, and winding cord about said wrapper and the inwardly folded ends thereof while the bobbin rotates.

6. In apparatus for wrapping an article having a wrapper thereon projecting beyond ends thereof, the combination of means for folding said projecting ends inwardly and gripping the same to support said article, and means whereby a cord or the like may be wound about said wrapper and the inwardly folded ends thereof to secure said wrapper to said article.

7. In apparatus for wrapping an article having a wrapper projecting beyond ends of the body thereof, the combination of means for folding such projecting portions of the wrapper inwardly and gripping the same to support said article, means for rotating such folding and gripping means and the article carried thereby, and means whereby a cord or the like is adapted to be wound about said wrapper and the inwardly folded portions thereof while said article is rotated.

8. In apparatus for wrapping dry cell bobbins, the combination with means for supporting a dry cell bobbin comprising a body of depolarizing material and an electrode embedded therein and projecting from one end thereof, of mechanism adapted to apply a cord or the like to said body of depolarizing material but not to the outer end of said electrode, such mechanism comprising means so constructed and arranged that successive turns of said cord or the like are spaced apart substantial distances.

9. In apparatus for wrapping dry cell bobbins, the combination with means for rotatably supporting a dry cell bobbin comprising a depolarizer body and an electrode projecting axially therefrom, of means for rotating such supporting means and a bobbin thereon, and means cooperating with such rotating bobbin and so constructed and arranged as to wind cord thereon over only a portion of the length and surface of the bobbin so as to leave the outer end of said electrode uncovered, and so as to leave the major portion of said depolarizer body uncovered by such cord.

10. In apparatus for wrapping dry cell bobbins, the combination with means for gripping and rotatably supporting a dry cell bobbin comprising a body of depolarizing material having an electrode embedded therein and a wrapper thereon, of means for rotating such gripping and supporting means and a bobbin thereon, and means so constructed and arranged that a cord or the like may be wound onto only a portion of the outer surface of said wrapper to secure the latter to said body and to leave portions of said wrapper uncovered by said cord or the like.

11. In an apparatus for winding cord or the like onto a dry cell bobbin comprising a body portion of depolarizing material having an electrode embedded therein and projecting therefrom, the combination of means for supporting said bobbin adjacent the end of the body thereof and gripping such electrode, a cord guide, and mechanism for moving said cord guide and such supporting means with a bobbin thereon relatively to one another and so constructed and arranged as to wind cord around portions of the body of said bobbin but to leave the greater portion of the exterior of said body uncovered by said cord.

12. In apparatus for wrapping a dry cell bobbin having applied thereto a wrapper that projects beyond the ends of the body of the bobbin, the combination of means for folding inwardly such projecting ends and gripping them so as to support the bobbin adjacent the ends of the body thereof, a cord guide, and mechanism for operating said folding and gripping means and said cord guide to wind cord around said wrapper including the inwardly folded ends thereof.

13. In a wrapping machine, the combination with mechanism for drawing a wrapper about an article and gripping portions of the wrapper to support said article, of means whereby cord or the like may be wound about said wrapper comprising a device for holding such cord adjacent its free end in fixed relation to said article and wrapper during such winding operation.

14. In a wrapping machine, the combination with means for rotatably supporting an article, of a cord holding device rotatable with such supporting means and adapted to clamp a cord independently of said article.

15. In a wrapping machine, the combination with means for rotatably supporting an article, of a cord holding device carried by such supporting means and rotatable therewith, said device being adapted to clamp the cord before the article is mounted on such supporting means, and a cord guiding device movable along an article carried by such supporting means as said article is rotated.

16. In a wrapping machine, the combination with means adapted to fold the end of a wrapper about the end of an article, of mechanism for so winding a cord or the like about said folded end that at least one turn of the securing cord crosses a previously applied turn to prevent the unravelling of such previously applied turn.

17. In a wrapping machine, the combination with means adapted to fold the end of a wrapper inwardly about the end of an article and grip such inwardly folded end, of a cord guide, and mechanism for operating such cord guide and such folding and gripping means to wind crossing turns of cord about the inwardly folded end of said wrapper.

18. In a wrapping machine, the combination with means for winding a securing cord or the like about an article, of means for applying an adhesive or cementitious substance to the last turn of said winding and to said article to secure said cord.

19. In a wrapping machine, the combination with means for winding a cord about a wrapper on an article, of rotatable means for applying binding substance, such as sealing wax, to the last turn of such winding and to an adjacent portion of said wrapper to secure said winding.

20. In a wrapping machine, the combination with means for winding cord about the wrapper on an article, of means for applying a dab of sealing wax to the last turn of such winding and to an adjacent part of said wrapper, such applying means comprising a sealing-wax container, heating means therefor, an applying device adapted to take up sealing-wax from said container, and mechanism for operating said device.

21. In a wrapping machine, the combination of means adapted to fold the ends of a wrapper about the ends of an article and to grip the same, means for winding a cord or the like about said wrapper and about the folded and gripped ends thereof, such winding means being adapted and arranged to so wind said cord about one end of said wrapper as to secure it to prevent accidental unravelling thereof, and means adapted to secure the last turn of said cord to said article after the completion of the winding operation.

22. In a wrapping machine, the combination of means adapted to fold the ends of a wrapper about the ends of an article and to grip the same, means for winding a cord or the like about said wrapper and about the folded and gripped ends thereof, such winding means being adapted and arranged to so wind said cord about one end of said wrapper as to secure it to prevent accidental unravelling thereof, means adapted to secure the last turn of said cord to said article after the completion of the winding operation and means for severing said cord after the completion of the winding operation and after the operation of such securing means.

23. In a wrapping machine, the combination with means for winding cord or the like about an article, of means for securing the first and last turns of such winding to the article, and means for severing said cord after the completion of the winding and securing operations.

24. In a wrapping machine, the combination with means for winding cord or the like about an article, of means for securing the first and last turns of such winding to the article, means for severing said cord after the completion of the winding and securing operations, and means for holding said cord adjacent the severing point during the operation of such severing means.

25. In a wrapping machine, the combination with means for winding cord about an article comprising rotatable means for holding such cord adjacent an end thereof, of mechanism whereby such end of the cord is released and another portion of the cord is presented to such holding means.

26. In a wrapping machine, the combination with means for winding cord about an article comprising a device for holding such cord adjacent an end thereof and independently of said article during the winding operation, of mechanism operative at the completion of such winding operation to release said holding device and withdraw said cord therefrom.

27. In a wrapping machine, the combination with means for winding cord about an article comprising a releasable device for clamping said cord adjacent an end thereof and independently of said article during the winding operation, means whereby said cord is withdrawn from such clamping device and another part of said cord is clamped by said device, and means for severing said cord between said last mentioned part and the last turn on said article.

28. In a wrapping machine, the combination with means for rotating an article, of a cord clamp independent of said article but rotatable therewith, a cord guide movable along said article, mechanism whereby said cord is withdrawn from said clamp and another part thereof is clamped thereby, and means for severing said cord between said last mentioned part and said article.

29. In a wrapping machine, the combination with mechanism for folding the ends of a wrapper about an article and gripping such ends, of means whereby a cord may be wound about said wrapper including the ends thereof, and means for maintaining a substantially uniform tension on said cord during such winding operation.

30. In a wrapping machine, the combination with means for winding cord or the like about an article, of mechanism for operating such winding means comprising cooperating clutch members, means for constantly driving one clutch member, and means for controlling the operation of the other clutch member by such constantly driven member.

31. In a wrapping machine, the combination with an article support, of means for winding cord about an article, and mechanism for operating such means controlled by said support.

32. In a wrapping machine, the combination with a support for an article having applied thereto a wrapper that projects beyond the ends of the body of such article, of means for folding such projecting ends inwardly over the ends of said body, and mechanism for operating such folding means controlled by said support.

33. In a wrapping machine, the combination with a movable article support, of means for gripping an article on said support and winding cord thereon, and mechanism for operating such gripping and winding means controlled by the movement of said support.

34. In a wrapping machine, the combination with driving means including a clutch, of a movable article support, means for gripping an article on said support and winding cord thereon, mechanism for operating such gripping and winding means, and means operable by the movement of said article support to control said clutch and the operative connection of said driving means and such operating mechanism.

35. In a wrapping machine, the combination with a depressible article support, of means for accurately positioning an article on said support, and mechanism for winding cord or the like about said article, such means and mechanism being rendered operative by the depression of said support.

36. In a wrapping machine, the combination with an article support, of means adapted to push an article along said support to accurately position the same, and mechanism for gripping such article and winding a number of turns of cord or the like about the same.

37. In a wrapping machine, the combination with mechanism for simultaneously folding all parts of the end of a wrapper inwardly about the end of an article, of means in addition to such folding mechanism for radially compacting such inwardly folded end.

38. In a wrapping machine, the combination with an article support, constantly operative driving means, a drive shaft, clutch means operative to connect said drive shaft to said driving means and controlled by movement of said article support, a cam shaft operable by said drive shaft, mechanism for gripping an article on said support and winding cord or the like about the same, and means including cams on said cam shaft for controlling the operation of said mechanism.

39. In apparatus for wrapping dry cell bobbins having a body of depolarizer and an electrode projecting from one end of such body, the combination of a support for a bobbin having applied thereto a wrapper that projects beyond the ends of said body, means for folding such projecting ends inwardly over the ends of said body and gripping the same, cord manipulating means, and mechanism for operating such folding and gripping means and said cord manipulating means to wind a securing cord around said wrapper and the inwardly folded ends thereof.

40. The invention claimed in claim 39 in combination with a device adapted to engage said electrode to position said bobbin on said support before such folding and gripping means operate.

41. The invention claimed in claim 39 in which said folding and gripping means comprises a pair of opposed groups of radially movable fingers.

42. The invention claimed in claim 39 in which said folding and gripping means comprises opposed, axially movable groups of pivoted fingers, means adapted to open and close said fingers radially and means adapted to move such opposed groups axially toward and away from one another.

43. The invention claimed in claim 39 in which said mechanism comprises clutch means, and said support is operable to control said clutch means to start the operation of said mechanism.

44. The invention claimed in claim 39 in which said cord manipulating means comprises a cord guide movable along said bobbin, and said mechanism comprises means for rotating said folding and gripping means and simultaneously moving said cord guide along said bobbin.

45. The invention claimed in claim 39 in which such folding and gripping means comprises a pair of heads carrying fingers, and said cord manipulating means comprises a cord holding device carried by one of said heads.

46. The invention claimed in claim 39 in which said cord manipulating means comprises means for severing a cord.

47. The invention claimed in claim 39 in which said cord manipulating means comprises a rockable member having cord releasing means and cord severing means thereon.

48. The invention claimed in claim 39 in which such folding and gripping means comprises a notched plate adapted to compact the wrapper adjacent the bottom end of the bobbin.

49. The invention claimed in claim 39 in which said cord manipulating means comprises means for severing the cord after the winding operation, in combination with means for holding down the last turn of the cord during the severing operation.

50. The invention claimed in claim 39 in which said cord manipulating means comprises means whereby successive turns of the cord around the electrode or top end of the bobbin cross one another to prevent unravelling of the cord.

51. The invention claimed in claim 39 in combination with means for applying cementitious substance such as sealing-wax to secure the last turn of the cord to the wrapper on the bobbin.

52. The invention claimed in claim 39 in which said cord manipulating means comprises means for severing the cord after the winding operation, and in combination with means for applying cementitious substance, such as sealing-wax, to the last turn of the cord and to the wrapper to secure said cord, and means for holding the last turn of the cord against the bobbin during such severing operation.

53. The invention claimed in claim 39 in which said support comprises a saddle, a rockable lever carrying said saddle, and means whereby the depression of said saddle and the rocking of said lever releases such operating mechanism.

54. The method of removing a loose end of a cord winding on an article that comprises burning off such end.

55. The method of removing loose ends of a cord winding on an article that comprises moving such loose ends past a flame to ignite them whereby they are burned off.

56. The method of removing loose ends of a cord winding on a dry cell bobbin, such winding being secured to the bobbin at distances from the extremities of such ends, such method comprising igniting the loose ends whereby they burn off to the points where the winding is secured to the bobbin.

57. In a machine of the class described, the combination with igniting means, of means for moving loose ends of cord windings on articles past such igniting means to ignite such ends, whereby they are burned off.

58. In a wrapping machine, the combination with means for supporting cord-wound articles, such cord winding having loose ends, of means whereby such loose ends are ignited.

59. The combination with a support for dry cell bobbins comprising a cord winding having loose ends, of means for effecting the removal of such ends.

60. The combination with a support for dry cell bobbins comprising a cord winding having loose ends, of means for burning off such ends.

61. In a machine of the class described, the combination with a carrier for articles comprising cord windings having loose ends, of means whereby such ends are arranged in position to be removed, and means whereby such ends are removed.

62. In a machine of the class described, the combination with a carrier for articles comprising cord windings having loose ends, of means for directing a blast to arrange such ends in position to be removed, and means for igniting such ends whereby they are burned off.

63. The combination with mechanism for applying a cord winding to an article and securing such winding so as to leave loose ends, of means for removing such loose ends.

64. The combination with mechanism for winding a cord about a dry cell bobbin and securing said cord so as to leave loose ends on the bobbin, of means for removing such loose ends.

65. In a bobbin wrapping machine, the combination of mechanism comprising a shaft for winding a cord about a dry cell bobbin and securing said cord so as to leave loose ends on the bobbin, a carrier for wound bobbins, means whereby said carrier is driven by said shaft, and means for removing loose ends of windings on bobbins mounted on said carrier.

66. The invention claimed in claim 65 in combination with means operable to direct a blast so as to arrange said loose ends for removal, and in which said removing means comprises a burner for igniting and burning off such ends.

67. In a bobbin wrapping machine, the combination with mechanism, including an intermittently operable shaft, for winding a cord onto a dry cell bobbin and securing said cord so as to leave loose ends depending from the bobbin; a rotatable carrier for wound bobbins; means operatively connecting said carrier to said shaft; means for directing an air blast onto bobbins on said carrier to arrange said loose ends for removal; means for igniting said loose ends; and means for releasing bobbins from said carrier.

68. In apparatus for wrapping dry cell bobbins comprising a cylindrical body having an electrode projecting from one end thereof, the combination of means operative to support said bobbin adjacent the ends of said body, means for guiding a cord or the like to said body, means for operating such supporting means and such guiding means relatively to one another to wind such cord around said body, such operating means being so constructed and arranged that successive cord turns intermediate the ends of said body are widely separated, and means cooperating with such supporting means to automatically release said bobbin after such winding operation.

69. In apparatus for winding cord about the body of a dry cell bobbin, the combination of means for supporting a dry cell bobbin adjacent the ends of its body, a cord retaining and guiding member movable lengthwise of said body, and mechanism for reciprocating said member in a fixed path back and forth along said body and rotating such supporting means with a dry cell bobbin thereon relatively to said member and so constructed and arranged as to wind cord in spaced turns around the exterior of said body.

70. In apparatus for wrapping dry cell bobbins comprising a cylindrical body having an electrode of smaller diameter than said body projecting from one end thereof, the combination of gripping means operative to support said bobbin adjacent the ends of said body, part of said gripping means being so constructed and arranged as to fit around said electrode; means so constructed and arranged that a number of spaced turns of a cord or the like are wound around and secured to said body, the turns on the cylindrical surface of said body covering only a minor portion of said surface and means automatically operating said gripping means to release said bobbin after such winding and securing operation.

71. In a machine of the class described, the combination of rotatable means for supporting an article, means for rotating such supporting means with an article thereon, and mechanism constructed and adapted to apply cord or the like to said article from one end thereof to a point which is a substantial distance from the opposite end of said article, said mechanism comprising means so constructed and arranged that said cord or the like is permanently secured to said article and means so constructed and arranged that successive turns of said cord or the like are separated a substantial distance.

72. In apparatus for wrapping dry cell bobbins, the combination with means for supporting a dry cell bobbin comprising a depolarizer body having a wrapper thereon and an electrode projecting axially from said body and wrapper, of mechanism whereby a cord may be applied to said wrapper to secure it to said body and leave the projecting end of said electrode exposed, said mechanism comprising means so constructed and arranged that successive turns of said cord are spaced apart substantial distances and leave exposed the major portion of said wrapper.

73. An electrode wrapper affixing machine comprising mechanical operable means for winding a single strand of cord about the body portion and ends of said electrode, automatically operable means for attaching the ends of the cord to the wrapper and means for automatically severing the ends of the cord from the electrode.

74. An electrode wrapper affixing machine comprising means for supporting the electrode, a bobbin for winding a cord about said electrode, sealing means for securing the free ends of said cord to said electrode, and means for severing the cord from the electrode.

75. A wrapping machine comprising means to retain and release articles, mechanism to wind string around the articles successively, and means to sever the string after being wound on the articles and means to traverse the string along the article while winding the string thereon such winding mechanism and traversing means so cooperating and constructed and arranged to apply said string that successive turns of the string shall be a substantial distance apart to leave the greater portion of the surface of the finished article uncovered by the string.

76. In apparatus for wrapping dry cell bobbins, the combination of means for supporting a dry cell bobbin and a wrapper, said bobbin comprising a depolarizer body having an electrode projecting axially from one end thereof and said wrapper enclosing said body; mechanism so constructed and arranged that a cord or the like is so applied to said wrapper as to secure said wrapper to said body but to leave substantial portions of said wrapper exposed and uncovered by said cord or the like.

77. In a machine for wrapping dry cell bobbins, each bobbin comprising a cylindrical body of depolarizing material and an electrode of smaller diameter than said body embedded in and projecting axially from one end of said body, the combination of means for supporting a bobbin and a wrapper enclosing the body thereof, said means comprising a device for gripping said electrode and clamping a portion of said wrapper thereabout; means for operating said device; and mechanism constructed and arranged for applying a securing cord to the outside of said wrapper, but not to the outer end of said electrode, to secure said wrapper to said body, said mechanism comprising means so constructed and arranged that successive turns of said cord are spaced apart substantial distances along the cylindrical part of said wrapped body to leave the major portion of said wrapper uncovered by said cord.

78. The combination with means for winding a securing cord or the like about an article, of means for applying an adhesive or cementitious substance to a portion of said cord or the like and to a portion of said article to secure said cord or the like.

79. A method of wrapping a dry cell bobbin having a cylindrical depolarizer body and an electrode of smaller diameter than said body embedded in and projecting from one end of said body, such method comprising applying a wrapper to said depolarizer body so as to leave the outer end of said electrode uncovered; rotating the bobbin so wrapped about its longitudinal axis; and, while the bobbin rotates, applying cord about the wrapper on said body but not about the uncovered end of said electrode, to secure said wrapper to said bobbin.

80. A method of wrapping a dry cell bobbin having a cylindrical depolarizer body and an electrode of smaller diameter than said body embedded in and projecting from one end of said body, such method comprising applying a wrapper only to said depolarizer body so as to leave the outer end of said electrode uncovered; supporting said bobbin so wrapped and rotating the same at a substantially uniform rate about its longitudinal axis; and, while the bobbin rotates, applying cord about the wrapper on said body but not about the uncovered end of said electrode, to secure said wrapper to said bobbin, the turns of said cord being relatively few in number and successive turns being spaced apart substantial distances along the cylindrical part of said wrapped body to leave the major portion of said wrapper uncovered by said cord, whereby such securing cord will present a minimum of interference to electrolytic action when such bobbin is assembled in a dry cell.

SECONDO L. CASELLA.